United States Patent [19]

Solansky et al.

[11] Patent Number: 5,261,939
[45] Date of Patent: Nov. 16, 1993

[54] NITRIFICATION-INHIBITING AGENT

[75] Inventors: Svatopluk Solansky, Trostberg; Werner Goll, Garching; Richard Youngman, Chieming-Hart, all of Fed. Rep. of Germany

[73] Assignee: SKW Trostberg Aktiengesellschaft, Trostberg, Fed. Rep. of Germany

[21] Appl. No.: 701,594

[22] Filed: May 13, 1991

Related U.S. Application Data

[63] Continuation of Ser. No. 164,076, Mar. 4, 1988, abandoned.

[30] Foreign Application Priority Data

May 2, 1987 [DE] Fed. Rep. of Germany ....... 3714729

[51] Int. Cl.$^5$ .............................................. C05C 9/00
[52] U.S. Cl. ........................................ 71/29; 71/30; 71/902; 71/903
[58] Field of Search ............................................ 71/902

[56] References Cited

U.S. PATENT DOCUMENTS 3,544,295 12/1970 Nakamigawa et al. ................. 71/1
4,582,524 4/1986 Lobitz ..................................... 71/27
5,024,689 6/1991 Sutton ..................................... 71/29

FOREIGN PATENT DOCUMENTS 0022536 1/1981 European Pat. Off. .

OTHER PUBLICATIONS

CA 108(5):36742f "Effect . . . soils" 1987, Efimov et al.
Zheng et al, CA 43(7):69708z, "Degradation of Amidinothiourea in rice and soil", 1980.
CA 99(21):174837n "Soil Amendment Production", Nitto, 1983.
CA 82(17):1120445 "Interaction . . . amidinothioureas" Joshua et al. 1975.
CA 80(1):712k "Injurious . . . crops", Sampei et al, 1973.
Abstract DDR Pat. 222,471—Hartbrich et al., "Reagent Combination for presenting . . . ", Chem. Abstr. 103, 17755B; (1985).
Abstract USSR Pat. 1,137,096—Vodopyanov et al., "Inhibition of nitrification of nitrogen . . . ", Chem. Abstr. 102, 165902h (1985).
Abstract Soil Sci. Soc. Am. J. 50, 803-6 (1986)—Janzen et al., "Influence of Thiosulfate . . . ", Chem Abstr. 105, 59944a (1986).

Primary Examiner—Ferris Lander
Attorney, Agent, or Firm—Felfe & Lynch

[57] ABSTRACT

A nitrification-inhibiting agent is described which is characterized in that it comprises
a) dicyandiamide and
b) guanylthiourea and/or ammonium thiosulphate and/or ammonium phosphate.

This agent is distinguished by an increased activity compared to the individual components and by its low toxicity.

10 Claims, No Drawings

NITRIFICATION-INHIBITING AGENT

This is a continuation of U.S. patent application Ser. No. 164,076 filed on Mar. 4, 1988, now abandoned.

The present invention relates to an agent for inhibiting nitrification of ammonium-nitrogen, in particular in mineral and organic fertilizers in the soil.

It is known that ammonium nitrogen in the soil is converted relatively quickly into nitrate nitrogen by bacteria. This nitrification process is considerably influenced by the temperature, soil moisture content, pH and biological activity in the soil.

Since nitrate nitrogen, in contrast to ammonium nitrogen, does not adhere to soil particles, it can very easily be leached during precipitation, in particular on light, permeable soils. In this fashion, the nitrogen is lost to the plants as an important nutrient. In addition, nitrate accumulation in ground water or drinking water can occur, which, under certain circumstances, can lead to health problems.

Besides leaching losses, also considerable losses of gaseous nitrogen occur through denitrification of nitrate nitrogen.

These losses of nitrogen can be reduced, and the utilization of nitrogen-containing fertilizers can be decisively improved, by adding nitrification-inhibiting agents.

Thus, a number of nitrification-inhibiting agents, for example based on pyridine, aniline, chlorine or sulphur derivatives have been developed for this purpose.

However, these compounds have various disadvantages in practice, such as, for example, high volatility, which makes expensive incorporation into the soil necessary. In addition, these compounds are generally toxic and/or leave toxic residues in the soil. From the ecological point of view, only those known nitrification-inhibiting substances which are neither toxic nor present residue problems can thus be recommended for practical use. These include, in particular, nitrogen-containing compounds such as, for example, dicyandiamide, guanylthioruea or ammonium thiosulphate, which are degraded completely in the soil to form nitrogen which is available to plants. The low activity and duration of action of these compounds compared, for example, to pyridine derivatives is disadvantageous. They must therefore be used in relatively large amounts, causing not only financial problems, but also a number of applicational problems.

The present invention had the object of developing a nitrification-inhibiting agent which does not have the disadvantages mentioned of the prior art, but has an excellent activity and good application possibilities and is without toxicological and residue problems.

This object was achieved according to the invention by a nitrification-inhibiting agent which comprises
a) dicyandiamide and
b) guanylthiourea and/or ammonium thiosulphate and/or ammonium phosphate.

This is because it has surprisingly been shown that the agent according to the invention effects a significantly more intensive and longer-lasting inhibition of nitrification than results from addition of the inhibitory effects of the individual components a) and b). This synergistic effect, which is also strongly developed in combination with several individual components, was in no way foreseeable.

The nitrification-inhibiting agent corresponding to the present invention comprises component a), namely dicyandiamide, and at least one further component b), selected from the group comprising guanylthiourea, ammonium thiosulphate and ammonium phosphate, so that it comprises two to four individual components.

The ratio of the individual components to one another can be varied with broad limits, the magnitude of the synergistic effect naturally varying.

In two-component systems, mixtures comprising 20 to 80% by weight of dicyandiamide and 20 to 80% by weight of guanylthiourea are to be regarded as preferred.

Three-component systems which have proved particularly successful are mixtures comprising
20 to 70% by weight of dicyandiamide,
20 to 70% by weight of ammonium thiosulphate and
10 to 60% by weight of ammonium phosphate.

Finally, the agent according to the invention can be employed as a four-component system, preferably comprising
20 to 60% by weight of dicyandiamide
20 to 60% by weight of guanylthiourea
10 to 50% by weight of ammonium thiosulphate and
10 to 50% by weight of ammonium phosphate.

In the context of the present invention, ammonium phosphate is taken to mean ammonium-containing phosphate compounds, in particular ammonium dihydrogen phosphate, diammonium hydrogen phosphate and ammonium polyphosphate.

The nitrification-inhibiting agent according to the invention can be applied alone and in combination with nitrogen-containing fertilizers.

If it is applied without fertilizers, an application rate of 0.1 to 300 kg/ha, preferably 1 to 60 kg/ha, is recommended, it being possible for application to take place before, at the same time as or after fertilization.

If, in contrast, the agent according to the invention is used in combination with the nitrogen-containing fertilizer, the nitrification of which fertilizer is to be inhibited by said agent, it is suitably used in an amount of 0.1 to 30% by weight, preferably 1 to 15% by weight, relative to the fertilizer.

Suitable nitrogen-containing fertilizers are both mineral and/or organic fertilizers, where all ammonium salts, such as, for example, ammonium nitrate or ammonium sulphate, and also ammonia or urea can be employed in single- and multi-nutrient fertilizers in the case of the mineral nitrogen-containing fertilizers. Organic fertilizers are taken to mean, for example, liquid manure, sewage, sewage sludge and the like.

The use of the agent according to the invention is without problems as a consequence of its good applicational possibilities. It is equally highly suitable for solid and liquid fertilizers.

In order to prepare solid fertilizers, a controlled amount of the nitrification-inhibiting agent according to the invention is added to the fertilizers using conventional devices and mixed with these fertilizers or granulated, prilled or compacted together with them. In general, no problems occur either during addition and mixing of the agent according to the invention with liquid fertilizers (in the form of solutions or suspensions). The addition and mixing can be carried out during the preparation of the fertilizer solution or suspension or subsequently. In addition, the agent according to the invention is excellently suitable for the preparation of an aqueous suspension which can be applied using conventional plant sprayers. In addition, application can be combined with application of plant-protection agents and pesticides.

The nitrification-inhibiting agent corresponding to the present invention enables the amount of active compound to be reduced markedly compared to the individual components for the same activity and duration of action. Since all components have low toxicity and leave no dangerous residues in the soil, the agent proposed is excellently suitable for practical use.

The following examples are intended to illustrate the invention in greater detail, but without limiting it.

EXAMPLE 1

In an incubation experiment, 100 g of soil (sandy loam, pH 7.2) were mixed with 20 mg of urea nitrogen and the following amounts of inhibitors:
Experiment 1 = 1.5 mg of dicyandiamide (DCD)
Experiment 2 = 1.5 mg of guanylthiourea (GTU)
Experiment 3 = 1.5 mg of DCD + 1.5 mg of GTU As control, the same urea dose, but without inhibitors, was used in the soil. The soil was incubated at 60% relative air humidity and 20° C. in 0.5 liter plastic bottles. After an incubation time of 8, 12 and 16 weeks, the content of nitrate nitrogen in the soil was determined and the nitrification inhibition calculated from this in %, according to the following formula:

$$\text{Nitrification inhibition (\%)} = \frac{a - b}{a - c} \times 100$$

a = nitrate nitrogen content of the control
b = nitrate nitrogen content of the experiment
c = nitrate nitrogen content of the soil Results:

| | inhibition in % | | |
|---|---|---|---|
| | 8 weeks | 12 weeks | 16 weeks |
| Experiment 1: 1.5 mg of DCD = | 21 | 5 | 0 |
| Experiment 2: 1.5 mg of GTU = | 60 | 45 | 17 |
| Addition exper. 1 + exper. 2 = | 81 | 50 | 17 |
| Experiment 3: 1.5 mg of DCD + 1.5 mg of GTU = | 88 | 72 | 51 |

Common application of dicyandiamide and guanylthiourea produced nitrification inhibition which was 7, 22 and 34 percentage points higher than addition of the inhibition of the individual components.

EXAMPLE 2

The experiment was carried out as described in Example 1, but using ammonium sulphate as the nitrogen source.

Results:

| | inhibition in % | | |
|---|---|---|---|
| | 8 weeks | 12 weeks | 16 weeks |
| Experiment 1: 1.5 mg of DCD = | 23 | 10 | 0 |
| Experiment 2: 1.5 mg of GTU = | 50 | 38 | 13 |
| Addition exper. 1 + exper. 2 = | 73 | 48 | 13 |

-continued

| Results: | inhibition in % | | |
|---|---|---|---|
| | 8 weeks | 12 weeks | 16 weeks |
| Experiment 3: 1.5 mg of DCD + 1.5 mg of GTU = | 82 | 66 | 44 |

Common application of dicyandiamide and guanylthiourea produced nitrification inhibition which was 9, 18 and 31 percentage points higher than addition of an inhibition of the individual components.

Several experiments were carried out as described in Example 2, but using various inhibitor combinations of dicyandiamide and guanylthiourea. After an incubation time of 12 weeks, the active ingredient combinations surpassed the additive inhibition of the individual components by the following percentage points:

0.5 mg of DCD + 2.5 mg of GTU = 17%

1.0 mg of DCD + 2.0 mg of GTU = 21%

1.5 mg of DCD + 1.5 mg of GTU = 22%

2.0 mg of DCD + 1.0 mg of GTU = 25%

2.5 mg of DCD + 0.5 mg of GTU = 20%

EXAMPLE 4

The experiment was carried out as described in Example 1, but using ammonium thiosulphate (ATS) as a second component of the inhibitor combination. The incubation time was 4, 6 and 8 weeks.

Results:

| | inhibition in % | | |
|---|---|---|---|
| | 4 weeks | 6 weeks | 8 weeks |
| Experiment 1: 1.5 mg of DCD = | 50 | 36 | 21 |
| Experiment 2: 1.5 mg of ATS = | 12 | 6 | 2 |
| Addition experiment 1 + experiment 2 = | 62 | 42 | 23 |
| Experiment 3: 1.5 mg of DCD + 1.5 mg of ATS = | 65 | 50 | 38 |

Common application of dicyandiamide and ammonium thiosulphate produced nitrification inhibition which was 3, 8 and 15 percentage points higher than addition of the inhibition of the individual components.

EXAMPLE 5

The experiment was carried out as described in Example 1, but using a triple combination, comprising dicyandiamide (DCD), guanylthiourea (GTU) and ammonium thiosulphate (ATS). The incubation time was 8, 12 and 16 weeks.

Results:

| | inhibition in % | | |
|---|---|---|---|
| | 8 weeks | 12 weeks | 16 weeks |
| Experiment 1: 1.0 mg of DCD = | 15 | 2 | 0 |
| Experiment 2: 1.0 mg of GTU = | 41 | 23 | 8 |

-continued

Results:

| | inhibition in % | | |
|---|---|---|---|
| | 8 weeks | 12 weeks | 16 weeks |
| Experiment 3: | | | |
| 1.0 mg of ATS = | 2 | 0 | 0 |
| Addition | | | |
| experiment 1 + | | | |
| experiment 2 + | | | |
| experiment 3 = | 58 | 25 | 8 |
| Experiment 4: | | | |
| 1.0 mg of DCD + | | | |
| 1.0 mg of GTU + | | | |
| 1.0 mg of ATS = | 77 | 60 | 48 |

The triple combination of dicyandiamide, guanylthiourea and ammonium thiosulphate produced nitrification inhibition which was 19, 35 and 40 percentage points higher than addition of the inhibition of the individual components.

EXAMPLE 6

The experiment was carried out as described in Example 1, ammonium polyphosphate (APP) in the form of a commercially available NP solution (10:34) being added to the various inhibitor combinations. The incubation time was 4 weeks in the experiments 1 and 2 and 12 weeks in the experiments 3 and 4.

| | Results: |
|---|---|
| Experiment 1: | |
| 1.5 mg of DCD<br>1.5 mg of ATS | without APP = 66% inhibition |
| Experiment 2: | |
| 1.5 mg of DCD<br>1.5 mg of ATS | with APP = 75% inhibition |
| Experiment 3: | |
| 1.0 mg of DCD<br>1.0 mg of GTU<br>1.0 mg of ATS | without APP = 60% inhibition |
| Experiment 4: | |
| 1.0 mg of DCD<br>1.0 mg of GTU<br>1.0 mg of ATS | with APP = 73% inhibition |

Addition of ammonium polyphosphate increases the inhibition of nitrification by 9 or 13 percentage points respectively.

EXAMPLE 7

In a pot experiment (7 kg of soil in a Mitscherlich pot), the influence of inhibitor combinations comprising dicyandiamide (DCD) and guanylthiourea (GTU) on the leaching of nitrate nitrogen after fertilization with urea was investigated. The following proportions (%) of the applied urea nitrogen were leached within the first three weeks after fertilization:

| Urea without inhibitor | = 48.2% |
|---|---|
| Urea with 10% of DCD nitrogen | = 19.9% |
| Urea with 10% of GTU nitrogen | = 14.2% |
| Urea with 5% of DCD nitrogen<br>+ 5% of GTU nitrogen | = 10.3% |

EXAMPLE 8

In a field experiment, the effect of the inhibitor combination comprising dicyandiamide (DCD), guanylthiouruea (GTU) and ammonium thiosulphate (ATS) on the yield of sugar beet was tested. The active ingredient combination was applied before sowing the sugar beet together with urea ammonium nitrate solution (UAN) at a rate of 200 kg/ha of nitrogen (incl. inhibitor nitrogen). The following yields were achieved:

| | Yield | |
|---|---|---|
| Fertilization | t/ha | % |
| UAN without inhibitor = | 71.4 | 100.0 |
| UAN with 10% of DCD nitrogen = | 73.0 | 102.3 |
| UAN with 6% of DCD nitrogen +<br>4% of ATS nitrogen = | 75.1 | 105.2 |
| UAN with 4% of DCD +<br>2% of GTU nitrogen +<br>4% of ATS nitrogen = | 76.6 | 107.3 |

We claim:
1. A method for inhibiting nitrification of ammonium nitrogen in soil which comprises applying, at a rate of from 0.1 to 3000 kg/ha, a nitrification inhibiting agent consisting essentially of from 20 to 80% by weight of dicyandiamide and from 80 to 20% by weight of guanylthiourea.

2. A method according to claim 1 in which the nitrification inhibiting agent is applied at a rate of from 1 to 60 kg/ha.

3. A method for inhibiting nitrification of ammonium nitrogen in soil which comprises applying, at a rate of from 0.1 to 3000 kg/ha, a nitrification inhibiting agent consisting essentially of from 20 to 80% by weight of dicyandiamide and from 80 to 20% by weight of ammonium thiosulphate.

4. A method for inhibiting nitrification of ammonium nitrogen in soil which comprises applying, at a rate of from 0.1 to 300 kg/ha, a nitrification inhibiting agent consisting essentially of from 20 to 70% by weight of dicyandiamide, from 20 to 70 weight % of guanylthiourea and from 10 to 60% by weight of ammonium thiosulphate.

5. A method for inhibiting nitrification of ammonium nitrogen in soil which comprises applying, at a rate of from 0.1 to 3000 kg/ha, a nitrification inhibiting agent consisting essentially of from 20 to 70% by weight of dicyandiamide, from 10 to 60% by weight of ammonium thiosulphate and from 10 to 60% by weight of ammonium phosphate.

6. A method according to claim 5 in which the nitrification inhibiting agent is applied at a rate of from 1 to 60 kg/ha.

7. A method for inhibiting nitrification of ammonium nitrogen in soil which comprises applying, at a rate of from 0.1 to 3000 kg/ha, a nitrification inhibiting agent consisting essentially of from 20 to 60% by weight of dicyandiamide, from 20 to 60% by weight of guanylthiourea, from 10 to 50% by weight of ammonium thiosulphate and from 10 to 50% by weight of ammonium phosphate.

8. A method according to claim 1, 3, 4, 5, or 7 in which the nitrification inhibiting agent is applied in combination with a nitrogen-containing fertilizer in an amount of from 0.1 to 30% by weight relative to the fertilizer.

9. A method according to claim 7 in which the nitrification inhibiting agent is applied at a rate of from 1 to 60 kg/ha.

10. A method according to claim 2, 6 or 9 in which the nitrification inhibiting agent is applied in combination with a nitrogen-containing fertilizer in an amount of from 0.1 to 15% by weight relative to the fertilizer.

* * * * *